Jan. 3, 1956 R. L. DORT 2,729,048
WINDROW PICKUP AND DISTRIBUTING DEVICE
Filed Sept. 18, 1952 2 Sheets-Sheet 1
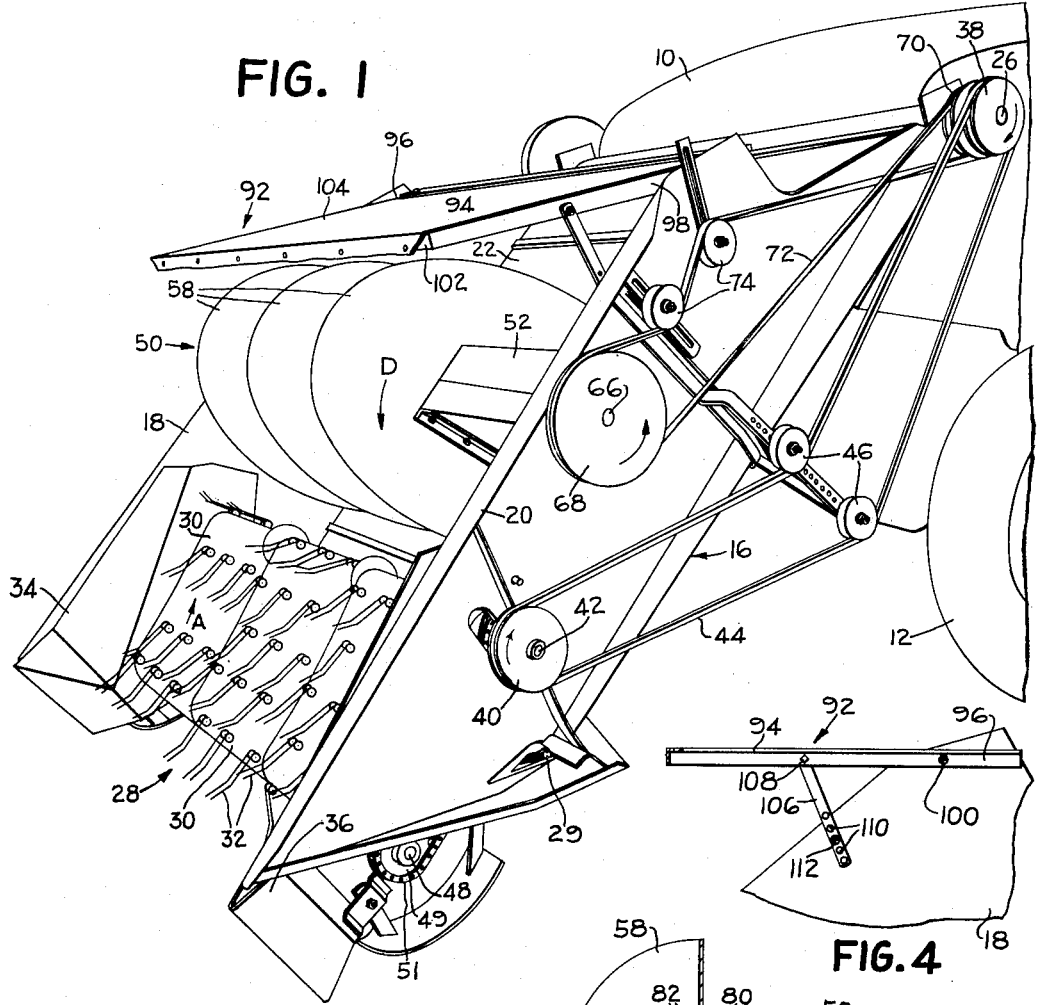
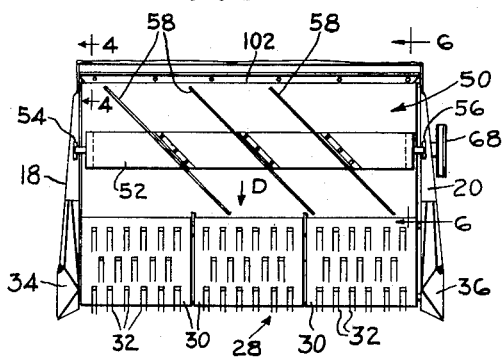
INVENTOR.
R. L. DORT
ATTORNEYS Jan. 3, 1956 R. L. DORT 2,729,048
WINDROW PICKUP AND DISTRIBUTING DEVICE
Filed Sept. 18, 1952 2 Sheets-Sheet 2
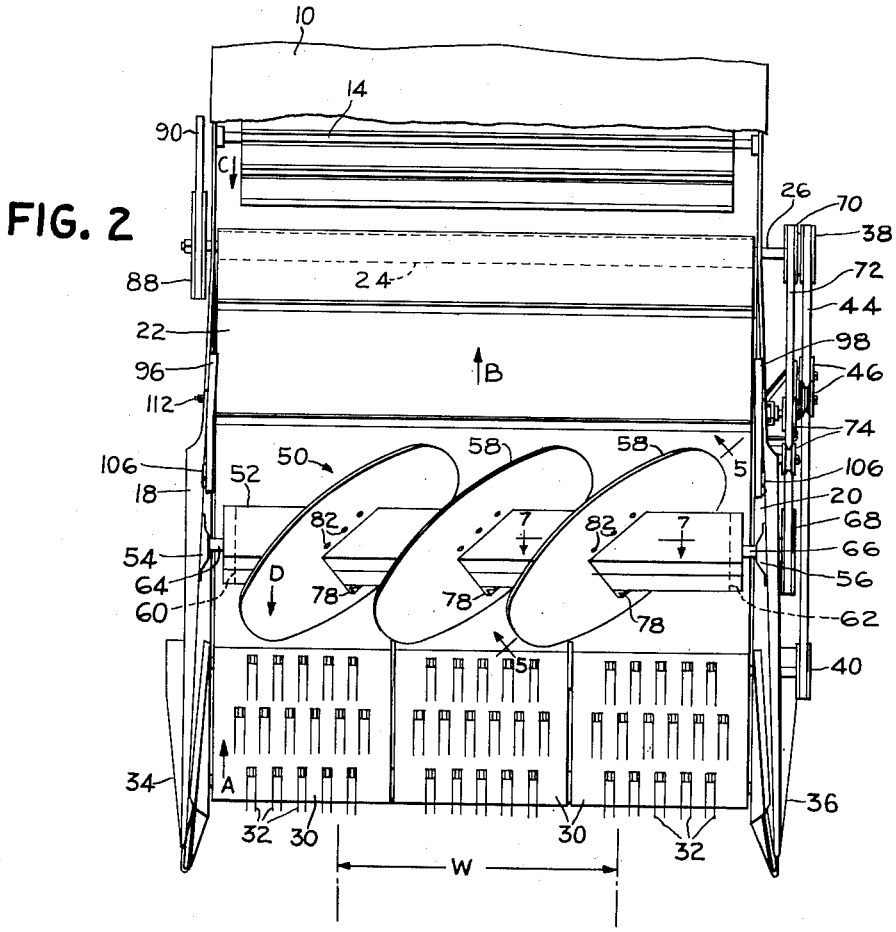
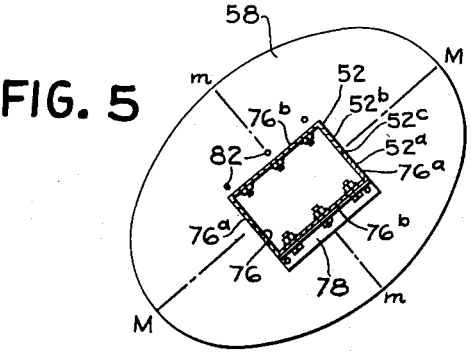
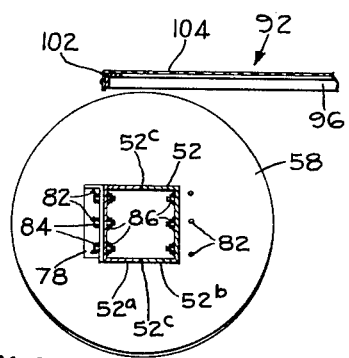
INVENTOR.
R. L. DORT
ATTORNEYS

United States Patent Office 2,729,048
Patented Jan. 3, 1956

2,729,048

WINDROW PICKUP AND DISTRIBUTING DEVICE

Russell L. Dort, Davenport, Iowa, assignor to Deere & Company, Moline, Ill., a corporation of Illinois Application September 18, 1952, Serial No. 310,205

10 Claims. (Cl. 56—351)

This invention relates to an agricultural machine and more particularly to a crop-handling machine. Still more specifically, the invention relates to a machine of the type that gathers previously cut windrowed crops and delivers such crops to crop-treating means such as threshing mechanism.

The conventional combine or so-called harvester thresher as known today may be considered as representative of a machine capable of carrying out the method of simultaneously harvesting and threshing grain crops. A typical combine includes cutting or harvesting means for severing the standing crops from the field, means for moving the crops to the threshing mechanism and various incidental mechanism for facilitating the crop transfer from the cutting means to the threshing mechanism. In many cases, however, the condition of the crop is such that it cannot be immediately threshed and in cases such as these the crop is handled by a machine known as a windrower, which simply cuts the crop and forms it into windrows parallel to the line of travel of the windrowing machine. After the windrowed crop has cured or otherwise attained a state in which it is considered ready for threshing, the windrows may be picked up and delivered to a suitable thresher.

Rather than to pick up the windrowed crops and transport them some distance to a stationary thresher, it is common practice to equip the conventional combine with pick-up mechanism in place of (or at least superseding) the usual cutting mechanism. Thus, the combine may be operated over the field of previously cut windrows and the pick-up means will operate to deliver the windrowed crop to the feeder means for ultimate delivery to the threshing mechanism of the combine. Pick-up mechanisms of the general character referred to are manufactured and sold as attachments for most commercially known combines and the practice of picking up windrows with a combine equipped with pick-up mechanism is a relatively standard procedure.

One of the difficulties experienced in the use of a combine and pick-up mechanism for gathering previously windrowed crops is that the windrows are often considerably narrower than the threshing mechanism and at the same time are considerably thicker than crops fed to the threshing cylinder when the combine is operated as a normal combined harvester and thresher. That is to say, the "blanket" of crops gathered by the pick-up mechanism will be narrower and thicker than the "blanket" of crops that is introduced to the threshing cylinder in the normal combining operation. This is particularly true in the case of the so-called straight-through combine in which the cutter bar, the conveying means and the threshing cylinder are arranged in series from front to rear in the order named. The cutter bar is made relatively wide in order to cut as wide a swath as is convenient and in most cases the feeder and the cylinder will be substantially as wide as or only slightly narrower than the cutter bar. The average width of these mechanisms materially exceeds the average width of a windrow and when the combine is used with a pick-up mechanism, the full capacity of the conveyor and cylinder is not used.

According to the present invention, it is proposed to utilize means for spreading the windrow into a width acceptable by the threshing cylinder. This is accomplished in the present case by means operative over the feeder conveyor—that is, behind the pick-up means and ahead of the cylinder—and operative to engage the relatively narrow picked up windrow and to cause it to be deflected laterally in opposite directions to thin out and widen the "blanket" of crops fed to the cylinder. Specifically, this object is accomplished by the provision of a rotatable device having thereon one or more plate-like elements fixed to the shaft and angled to the axis of the shaft so as to present generally radially extending areas of considerable size that sweep downwardly behind the pick-up means and from front to rear over the conveyor means and in a direction toward the threshing cylinder. Because of the angular relationship of the elements to the axis of the shaft and further because of the affixation of the elements to the shaft for rotation therewith, the large area surfaces presented deflect the crops laterally in opposite directions crosswise of the feeder conveyor so that the crops ultimately reach the cylinder in condition to utilize the cylinder's capacity to its utmost.

It is another feature of the invention that the preferred embodiment thereof incorporates a design that avoids shattering the crop. In this respect, the blade-like elements are each in the form of an elliptical member having a continuous periphery that lies in a single plane at an angle to the axis of the rotatable shaft. The elliptical element is so arranged that its minor axis is normal to the shaft axis and its major axis is at an acute angle to the shaft axis. When more than one element is used, the angles of the major axes are uniform so that the planes of the elements are parallel. Of further importance is the fact that the proportion of the minor axis of the element to the major axis thereof and the angle of the major axis to the shaft axis are such that the periphery of the element lies on the surface of a cylinder generated about the shaft axis and having the minor axis of the element as its diameter. Thus, the windrow is gently separated or spread rather than being violently torn apart and a considerable amount of pre-threshing is avoided, thus minimizing loss of grain.

It is another feature of the invention to provide the windrow-spreading device as an attachment capable of being installed in at least one well known type of combine without materially altering the basic structure of the combine. To this end, then, the invention resides not only in the combination of the device with the combine but also in its attachability as aforesaid and also in the various elements that make up the device.

It is a still further object of the invention to provide with the rotary windrow-spreading device a shield or hood capable of attachment to the feeder conveyor of the combine in such position as to overlie the device and to prevent crops from traveling upwardly and forwardly as the device rotates. This hood or shield is preferably adjustably mounted on the combine feeder so that the vertical position thereof relative to the device may be varied.

The foregoing and other important objects and desirable features inherent in and encompassed by the invention will become apparent from the following detailed disclosure of a preferred embodiment of the invention as contained in the accompanying specification and drawings in which Figure 1 is a perspective view from the left-hand front side of the forward portion of a combine of the straight-through type.

Figure 2 is a plan view of the structure shown in

Figure 1, with the windrow spreader hood omitted and other parts broken away.

Figure 3 is a front view, on a reduced scale, of the structure shown in Figures 1 and 2.

Figure 4 is a fragmentary view on an enlarged scale as seen along the line 4—4 of Figure 3 and showing part of the details of the mounting of the windrow spreader hood.

Figure 5 is a sectional view, on an enlarged scale, as seen along the line 5—5 of Figure 2.

Figure 6 is a sectional view, on the scale of Figure 5, as seen along the line 6—6 of Figure 3.

Figure 7 is a fragmentary sectional view, on the scale of Figures 5 and 6, as seen along the line 7—7 of Figure 2.

The portion of the combine illustrated here is of the same general nature as that forming the subject matter of the U. S. patent to Anderson 2,367,990. Familiarity with many of the details of the combine will be assumed.

To the extent visible, the combine shown here comprises a longitudinal main frame or body 10 rendered mobile by one or more wheels 12 for advance over a field. In the particular case herein considered, the field will contain crops that have been previously cut and formed into windrows. The body 10 contains the usual threshing mechanism, none of which is shown with the exception of a threshing cylinder generally indicated by the numeral 14 in Figure 2.

A feeder 16 extends downwardly and forwardly from the threshing cylinder 14 and has opposite longitudinal sides 18 and 20 spaced apart transversely a distance but slightly greater than the length of the cylinder 14. As is conventional, the feeder includes an upwardly inclined floor (not shown) over which operates the upper run of an endless apron or conveying means 22. The upper roller about which the apron 22 is trained is shown in dotted lines at 24 in Figure 2. A similar roller is present (not shown here) at the lower end of the apron. The position of the upper roller may be visualized in Figure 1 on the basis of the position of an input shaft 26 to which the roller 24 is keyed. The lower roller (not visible) is disposed, as is conventional in similar machines, just below the delivery end of a pick-up means or mechanism designated generally by the numeral 28. In the absence of the pick-up means 28, the combine operates as a normal combining machine and standing grain is cut from the eld by a cutter bar 29 for delivery directly to the apron 22 which ultimately delivers the cut grain to the threshing cylinder 14. In the present case, the cutter bar 29 is superseded by the pick-up mechanism 28, since it is assumed that the grain has already been cut and windrowed.

The pick-up mechanism may be of any suitable type and is here shown as one conventional means comprising a plurality of side-by-side endless belts 30 to which are affixed a plurality of spring pick-up teeth 32. These belts operate in the direction of the arrow A to pick up the windrowed crop for delivery onto the forward portion of the apron 22. The apron operates in the direction of the arrow B to carry the material to the threshing cylinder 14. This cylinder rotates in the direction of the arrow C (Figure 2).

The pick-up means 28 is mounted between forward extensions 34 and 36 of the feeder side walls 18 and 20 and accordingly the pick-up means is of a width substantially greater than that of the windrow. A windrow is shown schematically at W in Figure 2, wherein it is assumed that the combine is centered exactly on the windrow; although, it will be appreciated that the machine may veer to one side or the other, depending upon ground contour, but the end result is no different from that assumed here.

The projecting end of the upper apron shaft 26 has keyed thereto a sheave 38 in fore-and-aft alinement with a sheave 40 keyed to a pick-up means input shaft 42.

An endless belt 44 is trained about the two sheaves and is adjustably tensioned by a pair of tensioning idler rollers 46. The directions of rotation of the sheaves 38 and 40 are indicated by appropriate arrows. The pick-up mechanism 28 includes a lower shaft 48 having keyed thereto a sprocket 49 about which a chain 51 is trained. The other end of the chain is trained about a cooperating sprocket (not shown) keyed to the pick-up means input shaft 42 just inwardly of the side wall extension 36.

All of the structure just described is common to conventional combines equipped with pick-up mechanisms. Although the details may vary, the fundamentals are without distinction for the most part. What is added to the conventional combine according to the present invention is mechanism for spreading crops transversely across the width of the feeder apron 22 so that a wider and thinner "blanket" of material is fed to the thresher cylinder 14. The problem may be readily understood by comparing the width of the windrow W with the width of the cylinder 14.

The rotary windrow-spreading device is designated generally by the numeral 50. This device comprises essentially an elongated shaft means 52 substantially equal in length to the transverse distance between the sides 18 and 20 of the feeder 16 and including bearing means 54 and 56 respectively at opposite ends for rotatably supporting the device crosswise of and above the apron 22. The shaft means has means fixed thereto for rotation therewith and comprising a plurality of plate-like elements 58 projecting generally radially from the shaft means and angled to the axis of rotation of the shaft to deflect crops in opposite transverse directions across the conveyor. The direction of rotation of the rotary device 50 is as indicated by the arrow D so that the elements 58 sweep downwardly behind the pickup means 28 and then from front to rear over the apron 22. Because of the angular relation of the elements 58 to the shaft, as will be described in detail below, the elements represent portions on the device movable upon rotation of the device to impart transverse motion to the crops on the apron to deflect the crops laterally in opposite transverse directions as aforesaid.

The device 50 as shown herein as a preferred embodiment thereof is simply and economically constructed. The shaft means 52 is of tubular construction and is square in cross section (best shown in Figure 6). The tubular structure may be accomplished by placing two channel-shaped members 52a and 52b in face-to-face relationship and welding them along their abutting edges as indicated at 52c. The tubular structure may include at its opposite ends closure members 60 and 62 to which are respectively welded short stub shafts 64 and 66, all of which comprise means for journaling the shaft means 52 at its opposite ends in the side walls 18 and 20, the stub shafts 64 and 66 being, of course, coaxial and journaled in the bearing brackets 54 and 56.

The stub shaft 66 is sufficiently long to project outwardly through the proximate side sheet or side wall 20 and has keyed thereto a sheave 68 which is in fore-and-aft alinement with a second sheave 70 keyed to the upper roller shaft 26. An endless belt 72 is trained about the two sheaves 68 and 70 and is crossed to impart the correct direction of rotation to the device 50. Idlers 74 may be used to maintain the proper tension on the belt 72. For the purposes of simplicity and brevity, the shaft means 52 will be referred to hereinafter simply as the shaft.

The elements 58 are identical to each other. On the basis of the proportions of these elements to the shaft 52 and to the machine in which the device 50 is used, it is preferred that three of them be used as illustrated. Of course, a larger number may be used if desired, and in some cases the device may be found to work satisfactorily with only a single element. Each element is of elliptical configuration and is of plate-like form, so that its opposite faces are flat. These elements are preferably formed of sheet metal of an appropriate gauge and each is fixed to the shaft so that the plane thereof is at an acute angle to the axis of the shaft.

Each element 58 has a central rectangular opening 76 (Figure 5) and the shorter sides or dimensions of the opening, represented by the numerals 76a, are substantially equal to any one of the sides of the square shaft 52. The longer sides 76b are of such length as to accommodate the particular angled relationship of the element 58 to the shaft 52. In short, the opening 76 is such as to receive the shaft 52, which is passed through the alined openings 76 so that the elements 58 are coaxially arranged on the shaft in uniformly spaced relation lengthwise of the shaft. The major axis M—M and the minor axis m—m of the element intersect at the axis of rotation of the shaft 52 and the element is arranged on the shaft so that the minor axis m—m is normal or at right angles to the shaft axis while the major axis M—M is at an acute angle to the shaft axis. Thus, the plane of the element 58 is at an acute angle to the shaft axis; and, since the element is flat, it may be said that all portions thereof lie in a single plane (ignoring for the present the thickness of the element). The proportion of the major axis M—M to the minor axis m—m and the angle of the element to the shaft 52 are such that the periphery of the element lies on the surface of a cylinder generated about the shaft axis and having as its diameter the minor axis m—m of the element. Accordingly, the element will appear as a circle when viewed from the end of the device 50 (Figure 6).

The size of the central mounting opening 76 is such, relative to the size of the shaft 52, as to accommodate the position of the element on the shaft at the angle just described. Thus, the longer side 76b is to the shorter side 76a as the major axis M—M is to the minor axis m—m.

As the device rotates, the surface portions of the elements operate as blades inclined to the flow of material in the direction B over the apron 22. The right-hand surface of each element (as viewed from the rear of the machine and looking forwardly) serves to deflect crops laterally to the right as the device rotates. Conversely, the left-hand surface portions tend to move the material to the left. The action is gentle but effective. Since the periphery of each element is continuous and smooth, unnecessary aggressiveness is avoided. The square shaft itself presents its corners as means for facilitating the separation and spreading of the crop. However, the shaft could as well be round or any other shape.

Each element is mounted on the shaft 52 by means of a pair of securing or mounting members 78 and 80. Each of these members is in the form of an angled bracket having angularly related flanges. One of the flanges is rigidly secured to one face of the element 58, as by a plurality of rivets 82 and the other flange is removably secured to the proximate side of the square shaft as by a plurality of cap screws 84 threaded respectively into a plurality of nuts 86 welded to the interior surface of the shaft. Each of the members or brackets 78 and 80 is equal in length to the long side 76b of the element central opening 76 and the members 78 and 80 are, of course, at diametrically opposite sides of the shaft 52.

Input power to the upper end of the apron roller 24 may be derived from any suitable source on the machine. A sheave 99 is illustrated as being keyed to the right-hand end (left-hand end as seen in Figure 2) of the upper roller shaft 26 and a belt 90 is shown as representative of one form of means that could be used to drive the apron and the associated parts, it being remembered that the rotary device 50 derives power in the first instance from the left-hand end of the upper roller shaft 26.

It is another feature of the invention to provide a hood means, designated generally by the numeral 92, in association with the rotary device 50. This hood means comprises, as illustrated, a rectangular frame 94, the opposite side portions of which comprise transversely spaced supports 96 and 98 for mounting respectively on the sides 18 and 20 of the feeder 16. Figure 4 shows the mounting of the one side of the hood means 92 as including a pivot 100. The side portions 96 and 98 extend forwardly over the device 50 and are, of course, spaced apart a distance transversely substantially equal to the length of the device. The side portions 94 and 96 are joined by a transverse front portion 102, and the hood includes an upper shield portion 104 that encloses the rectangular frame 94. The shield portion is here illustrated as being of canvas or any other appropriate fabric; although, any other type of material may be used.

The normal position of the shield 92 relative to the spreading device 50 is such that the elements 58 clear the underside of the shield means. The purpose of the shield is to prevent the rotary device from throwing crops upwardly and forwardly. The vertical relationship between the shield means 92 and rotary device 50 may be changed by adjusting the shield means. This is made possible by the provision here of means adjustable between the shield side portions 96 and 98 and the feeder side walls 18 and 20, as best shown in Figure 4. Each of these means comprises a link 106 pivoted at its upper end at 108 to the shield side member 96 and having its lower end portion provided with a plurality of apertures 110, any one of which may be used to receive a bolt 112 which passes through an appropriate opening (not shown) in the proximate side wall 18.

The general operation of the device has been described in connection with the description of the construction and design of the device and need not be repeated. Likewise, the salient features of the invention have been outlined above. Various other features not specifically enumerated will undoubtedly occur to those versed in the art, as will many modifications and variations in the preferred embodiment of the invention illustrated, all of which may be achieved without departing from the spirit and scope of the invention.

What is claimed is:

1. In a crop-handling machine adapted to advance over a field of windrowed crops and having pick-up means, conveying means behind and for receiving crops from the pick-up means and crop-treating means behind and for receiving crops from the conveying means, wherein at least the conveying means and the treating means are of greater width than a windrow, the improvement residing in mechanism for spreading the picked-up crop cross-wise of the conveying means before entry of the crop to the treating means, comprising: an elongated rotatable spreading device of a length substantially equal to the width of the conveyor means and including means for the mounting thereof over the conveyor means with its length crosswise of the conveyor means and for rotation so that it sweeps downwardly behind the pickup means and then from front to rear over the conveyor means, said device including portions movable upon rotation of the device to impart transverse motion to the crops on the conveyor means; and a hood having means for the affixation thereof to the machine to overlie the device in vertically spaced relation thereto to prevent crops moved by the device from traveling forwardly over the device.

2. In a crop-handling machine adapted to advance over a field of windrowed crops and having pick-up means, conveying means behind and for receiving crops from the pick-up means and crop-treating means behind and for receiving crops from the conveying means, wherein at least the conveying means and the treating means are of greater width than a windrow, the improvement residing in mechanism for spreading the picked-up crop cross-wise of the conveying means before entry of the crop to the treating means, comprising: an elongated rotatable spreading device of a length substantially equal to the width of the conveyor means and including a plate-like element having a continuous periphery lying in a plane at an acute angle to the axis of rotation of the device; means for mounting the device above and crosswise of the conveyor means for rotation such that the periphery of the element sweeps downwardly behind the pick-up means and then from front to rear over the conveyor means and so that the surface of the element simultaneously imparts transverse motion to the crops on the conveyor means; and a hood having means for the affixation thereof to the machine to overlie the device in vertically spaced relation thereto to prevent crops moved by the device from traveling forwardly over the device.

3. For a combine of the straight-through type having a mobile frame adapted to advance over a field of previously cut windrowed crops and including a threshing cylinder transverse to the line of advance and of greater width than a windrow, a feeder conveyor ahead of and in crop-transfer relationship to the cylinder and having opposite longitudinal sides spaced apart transversely a distance greater than such windrow, and windrow-pick-up means leading the conveyor for picking up crops from the windrow and depositing such crops on the conveyor for delivery to the cylinder: a crop-spreading device comprising an elongated shaft substantially equal in length to the transverse distance between the sides of the conveyor and including means for rotatably supporting said shaft crosswise of and above the conveyor; means fixed to the shaft for rotation therewith and having plate-like elements projecting radially from and angled to the shaft axis to deflect crops in opposite transverse directions across the conveyor means; and hood means cooperative with the shaft and elements and including transversely spaced supports mountable respectively on the sides of the conveyor means rearwardly of the shaft axis, an upper shield portion carried by and extending forwardly from the supports to overlie the device in position clear of the elements, said shield portion having a transverse dimension substantially equal to the length of the shaft and a fore-and-aft dimension substantially equal to the cylinder generated by rotation of the device, and means adjustable between the upper portion and at least one of the sides of the conveyor means for varying the vertical position of said upper portion relative to the device.

4. In a crop-handling machine adapted to advance over a field of windrowed crops and having pick-up means, conveying means behind and for receiving crops from the pick-up means and crop-treating means behind and for receiving crops from the conveying means, wherein at least the conveying means and the treating means are of greater width than a windrow, the improvement residing in mechanism for spreading the picked-up crop crosswise of the conveying means before entry of the crop to the treating means, comprising: an elongated rotatable shaft of a length substantially equal to the width of the conveyor means and including means for the mounting thereof over the conveyor means with its length crosswise of the conveyor means and for rotation in a downwardly and rearwardly direction; and crop-engaging means fixed to the shaft for rotation therewith and including an elliptical plate-like element having the intersection of its major and minor axes at the shaft axis and arranged with its minor axis normal to the shaft axis and its major axis at an acute angle to the shaft axis, and the proportion of the major axis to the minor axis and the angle of the major axis to the shaft axis being such that the periphery of the element lies on the surface of a cylinder generated about the shaft axis and having the minor axis as its diameter, the periphery of said element sweeping downwardly and rearwardly in close proximity to the conveying means.

5. The invention defined in claim 4, in which: the shaft is square in cross-section, and the element has therein a central rectangular opening through which the shaft passes, said opening having its short sides parallel to the minor axis of the element and substantially equal to a side of the square cross-section of the shaft, and its long sides parallel to the major axis of the element, and said sides of the opening being so proportioned relative to each other as to closely fit the associated sides of the square.

6. The invention defined in claim 5, in which: the mounting of the element on the shaft includes a pair of diametrically opposed securing members, one running along the junction of each of the longer sides of the opening in the element and the associated side of the shaft, each member being rigidly secured to the element and shaft along said junction.

7. The invention defined in claim 6, in which: each securing member is an angle bracket having angularly related flanges abutting and secured respectively to the proximate portions of the element and shaft.

8. The invention defined in claim 7, in which: the shaft-abutting flange of each bracket is removably secured to the shaft.

9. In a crop-handling machine adapted to advance over a field of windrowed crops and having pick-up means, conveying means behind and for receiving crops from the pick-up means and crop-treating means behind and for receiving crops from the conveying means, wherein at least the conveying means and the treating means are of greater width than a windrow, the improvement residing in mechanism for spreading the picked-up crop crosswise of the conveying means before entry of the crop to the treating means, comprising: an elongated rotatable shaft of a length substantially equal to the width of the conveyor means and including means for the mounting thereof over the conveyor means with its length crosswise of the conveyor means and for rotation in a downwardly and rearwardly direction; and crop-engaging means fixed to the shaft for rotation therewith and including a plurality of elliptical, plate-like elements coaxially spaced apart on the shaft, each element having its major and minor axes intersecting at the shaft axis and arranged with its minor axis normal to the shaft axis and its major axis at an acute angle to the shaft axis, the minor axes of the elements being equal to each other and the major axes of the elements being equal to each other, and the proportion of each major axis to its minor axis and the angle of each major axis to the shaft axis being such that the peripheries of the elements lie on the surface of a cylinder generated about the shaft axis and having an element minor axis as its diameter; and said elements being arranged on the shaft so that the major axes thereof are parallel.

10. The invention defined in claim 9, in which: the coaxial spacing of the elements is uniform and further such that each element overlaps its neighbor.

References Cited in the file of this patent

UNITED STATES PATENTS

| 2,282,238 | Newton | May 5, 1942 |
| 2,282,868 | Innes | May 12, 1942 |
| 2,335,764 | Innes | Nov. 30, 1943 |
| 2,369,745 | Millard et al. | Feb. 20, 1945 |
| 2,484,071 | Brauer | Oct. 11, 1949 |
| 2,490,143 | Magee | Dec. 6, 1949 |
| 2,533,691 | Remonte | Dec. 12, 1950 |